United States Patent
Kelsch et al.

(10) Patent No.: US 12,359,473 B2
(45) Date of Patent: Jul. 15, 2025

(54) ANTI-THEFT DEVICE WITH ELECTROMECHANICALLY RETRACTABLE LOCKING ARMS

(71) Applicants: Christopher A. Kelsch, Palm Harbor, FL (US); Vanguard Products Group, Inc., Oldsmar, FL (US)

(72) Inventors: Christopher A. Kelsch, Palm Harbor, FL (US); Wade Zhu, Land O'Lakes, FL (US); William Claude Chazotte, Brooksville, FL (US); Douglas Barthold, Oldsmar, FL (US); Brett Lyles, Lithia, FL (US)

(73) Assignee: Vanguard Products Group, Inc., Oldsmar, FL (US)

( * ) Notice: Subject to any disclaimer, the term of this patent is extended or adjusted under 35 U.S.C. 154(b) by 0 days.

(21) Appl. No.: 18/823,232

(22) Filed: Sep. 3, 2024

(65) Prior Publication Data
US 2025/0067090 A1    Feb. 27, 2025

Related U.S. Application Data

(63) Continuation-in-part of application No. 18/815,490, filed on Aug. 26, 2024.

(60) Provisional application No. 63/578,636, filed on Aug. 24, 2023.

(51) Int. Cl.
*E05B 73/00* (2006.01)
*F16M 11/04* (2006.01)
*F16M 11/22* (2006.01)

(52) U.S. Cl.
CPC ......... *E05B 73/0082* (2013.01); *F16M 11/04* (2013.01); *F16M 11/22* (2013.01); *F16M 2200/02* (2013.01)

(58) Field of Classification Search
CPC .............................. E05B 73/00; E05B 73/0082
USPC ....... 248/685, 686, 688, 689, 229.1, 229.12, 248/229.14, 229.15, 229.2, 229.22,
(Continued)

(56) References Cited

U.S. PATENT DOCUMENTS 6,831,560 B2    12/2004    Gresset
7,053,774 B2    5/2006    Sedon et al.
(Continued)

FOREIGN PATENT DOCUMENTS

WO    WO 2021/011625 A1    1/2021

*Primary Examiner* — Alfred J Wujciak
(74) *Attorney, Agent, or Firm* — Andriy Lytvyn; Hill Ward Henderson, P.A.

(57) ABSTRACT

An anti-theft device for securing merchandise against theft. The anti-theft device has a stand that mounts onto a display surface. A pair of arms is disposed in a linear sliding relationship relative to the stand. The arms terminate with inwardly facing grips that receive the opposing edges or corners of the merchandise. The arms have gear racks operatively engaged by a pinion gear. The pinion gear is joined to a concentrically aligned worm wheel, which is operatively engaged by a worm. A motor is configured to selectively spin the worm in the first or the second direction, thereby selectively retracting or extending the arms relative to the stand to secure or release the merchandise, respectively. The worm drive immobilizes the arms against being extended from the stand using manual force, thereby locking the merchandise to the stand. A fob may be used to transmit a signal that actuates the motor.

17 Claims, 9 Drawing Sheets

(58) Field of Classification Search
USPC ..... 248/229.24, 229.25, 176.1, 177.1, 178.1,
248/187.1, 682, 5, 51
See application file for complete search history.

(56) References Cited

U.S. PATENT DOCUMENTS

| | | | |
|---|---|---|---|
| 8,550,413 B2 * | 10/2013 | Warrick | B01L 9/50 |
| | | | 248/316.4 |
| 9,097,380 B2 | 8/2015 | Wheeler | |
| 9,159,309 B2 | 10/2015 | Liu et al. | |
| 9,161,466 B2 | 10/2015 | Huang | |
| 9,936,823 B2 | 4/2018 | Galant | |
| 10,001,153 B1 | 6/2018 | Fan | |
| 10,165,873 B2 | 1/2019 | Gulick, Jr. et al. | |
| 10,323,440 B1 | 6/2019 | Kelsch et al. | |
| 10,378,248 B1 | 8/2019 | Kelsch et al. | |
| 10,394,297 B1 | 8/2019 | Han | |
| 10,448,759 B1 | 10/2019 | Chapuis et al. | |
| 10,492,322 B1 | 11/2019 | Fan | |
| 10,793,080 B2 | 10/2020 | Zhang | |
| 11,035,151 B2 | 6/2021 | Kelsch et al. | |
| 11,178,983 B1 | 11/2021 | Kelsch et al. | |
| 11,714,454 B1 | 8/2023 | Wu et al. | |
| 11,781,348 B2 * | 10/2023 | Schuft | E05B 73/00 |
| | | | 248/551 |
| 11,952,803 B1 * | 4/2024 | Kelsch | E05B 47/0001 |
| 12,013,076 B1 | 6/2024 | Penny et al. | |
| 2005/0063125 A1 | 3/2005 | Kato | |
| 2014/0060218 A1 | 3/2014 | Bisesti et al. | |
| 2015/0060624 A1 * | 3/2015 | Huang | F16M 11/105 |
| | | | 248/316.4 |
| 2015/0186685 A1 * | 7/2015 | Vroom | F16H 35/10 |
| | | | 726/35 |
| 2015/0196140 A1 * | 7/2015 | Lin | F16M 13/00 |
| | | | 248/551 |
| 2015/0300050 A1 | 10/2015 | Van Balen | |
| 2016/0201359 A1 | 7/2016 | Berglund et al. | |
| 2016/0335860 A1 | 11/2016 | Richardson et al. | |
| 2017/0049251 A1 | 2/2017 | Gulick, Jr. et al. | |
| 2018/0258669 A1 | 9/2018 | Moock et al. | |
| 2018/0266457 A1 | 9/2018 | Du | |
| 2018/0295733 A1 | 10/2018 | Wen et al. | |
| 2018/0342136 A1 | 11/2018 | Hartweg et al. | |
| 2019/0125104 A1 | 5/2019 | Gulick, Jr. et al. | |
| 2019/0178010 A1 | 6/2019 | Moock et al. | |
| 2019/0301665 A1 * | 10/2019 | Wu | G06F 1/16 |
| 2019/0316386 A1 | 10/2019 | Gulick, Jr. et al. | |
| 2020/0040614 A1 | 2/2020 | Kelsch et al. | |
| 2020/0073438 A1 * | 3/2020 | Huang | G06F 1/1624 |
| 2020/0107653 A1 | 4/2020 | Leyden et al. | |
| 2020/0347648 A1 | 11/2020 | Moock et al. | |
| 2021/0001782 A1 | 1/2021 | Liu | |
| 2021/0040779 A1 | 2/2021 | Kelsch et al. | |
| 2021/0059437 A1 * | 3/2021 | Chapuis | F16M 11/04 |
| 2021/0123268 A1 | 4/2021 | Gulick, Jr. et al. | |
| 2021/0169239 A1 | 6/2021 | Gulick, Jr. et al. | |
| 2021/0228000 A1 * | 7/2021 | Schuft | E05B 73/0017 |
| 2023/0407683 A1 * | 12/2023 | Penny | E05B 73/0017 |
| 2024/0328211 A1 * | 10/2024 | Naderzad | E05B 73/0082 |
| 2024/0375275 A1 * | 11/2024 | Zimmer | B25J 9/1661 |

\* cited by examiner

ANTI-THEFT DEVICE WITH ELECTROMECHANICALLY RETRACTABLE LOCKING ARMS

PRIORITY CLAIM

This non-provisional patent application is continuation-in-part of and claims priority to the U.S. non-provisional patent application Ser. No. 18/815,490 filed on Aug. 26, 2024, which claims priority to the U.S. Provisional Application No. 63/578,636 filed on Aug. 24, 2023.

BACKGROUND OF THE INVENTION

1. Field of the Invention

This invention relates to merchandise anti-theft devices. More specifically, it relates to an anti-theft device for a retail display of a laptop computer.

2. Brief Description of the Related Art

Retailers often prefer to present their merchandise to consumers in a manner that allows the consumers to touch, inspect, and otherwise interact with the products at a display counter. Many merchandise items, especially portable electronic devices, are relatively expensive and, therefore, are under a serious threat of theft. Retailers often face a dilemma pertaining to how to interactively display their merchandise to attract customers and increase sales, while, at the same time, safeguarding the merchandise against theft. There is an unresolved need for a merchandise anti-theft device with electromechanically adjustable arms that can be actuated to lock and unlock the merchandise.

SUMMARY OF THE INVENTION

In an embodiment, the invention pertains to an anti-theft device for securing planar merchandise, such as a smartphone or a tablet. The anti-theft device includes a stand configured to be affixed to a display surface. The stand is configured to removable support the merchandise thereon. The anti-theft device further includes an adjustable arm having a first portion slidingly coupled to the stand and a second portion positioned outside the stand and terminating with a grip. The grip may have a U-shaped shape configured to receive an edge or a corner of the merchandise when the adjustable arm is in a closed position. The grip may be aligned with the stem of the adjustable arm or may branch out at an angle relative thereto. Multiple grips may be disposed on a single arm. In an embodiment, the anti-theft device may include multiple arms, each terminating with one or more grips.

Each arm has a gear rack disposed along the first portion thereof and operatively engaging a pinion gear that is rotationally disposed within the stand. Rotation of the pinion gear in a first direction causes each adjustable arm to retract relative to the stand, while rotation of the pinion gear in the second direction causes each adjustable arm to extend relative to the stand. The first and the second gear racks may be disposed in an opposing relationship with one another relative to the pinion gear, such that the pinion gear synchronizes inward retraction and outward extension of the first and the second adjustable arms.

The pinion gear is joined to a worm wheel in a concentric alignment. The worm wheel and the pinion gear collectively forming a gear assembly. The locking mechanism of the anti-theft device includes a worm that is rotationally disposed within the stand and operatively engages the worm wheel, which collectively form a worm drive. The worm precludes the gear assembly from rotating while the worm drive is not operating, thereby immobilizing the adjustable arm relative to the stand. The worm drive prevents the adjustable arm from being extended or retracted via application of a manual force.

A motor is disposed within the stand and is operatively connected to the worm drive. The motor has a first operating mode in which the motor causes the gear assembly to rotate in the first direction thereby retracting the adjustable arm relative to the housing, thus securing the merchandise within the grip. The motor also has a second operating mode in which the motor spins the worm in reverse, causing the gear assembly to rotate in the second direction thereby extending the adjustable arm relative to the housing and releasing the merchandise from the grip, which enables removal of the merchandise from the stand.

The motor may be actuated using a fob configured to transmit a first signal to a receiver disposed within the stand, such that the motor is actuated in a first operating mode in response to the receiver detecting the first signal, thereby rotating the gear assembly in the first direction and retracting the adjustable arm to secure the merchandise. The fob may be further configured to transmit a second signal to actuate the motor in the second operating mode, thereby causing the gear assembly to rotate in the second direction, thus extending the adjustable arm to release the merchandise.

The motor may be configured to cease operating in response to detecting increased resistance. In this manner, the motor will stop retraction of the adjustable arm when the merchandise is fully secured within the grip and will stop extension of the adjustable arm when the pinion gear engages a stop at a terminal end of the rack gear.

In another embodiment, the invention may be an anti-theft device for a laptop computer. The anti-theft device includes a stand that has a base portion configured to be anchored to a display surface and configured to support a body of the laptop computer thereon. The stand may have an angular configuration that includes a lateral portion joined at an angle to the base portion. A housing may be affixed to the lateral portion of the stand. The anti-theft device further includes one or more adjustable arms. The adjustable arm has a first portion slidingly disposed within the housing and a second portion positioned outside the housing and terminating with a grip.

The grip may be U-shaped and may be configured to receive an edge of a lid portion of the laptop computer. The U-shaped configuration of the grip permits the edge of the lid portion of the laptop to translate in a transverse direction relative thereto. Furthermore, in an embodiment, the grip does not engage the base portion of the laptop computer while the base portion is at rest. Thus, the laptop computer may be lifted from the stand and raised to a height until the base portion of the laptop engages the grips, which will preclude the base portion from being raised any higher. When the laptop computer is lifted or lowered in such manner, the edge of the lid portion translates transversely within the U-shaped grip while remaining secured therein.

The adjustable arm includes a gear rack disposed along the portion of the arm that is slidingly disposed within the housing. A pinion gear is rotationally disposed within the housing and operatively engaged with the gear rack of the adjustable arm. Due to this engagement, inward retraction of the adjustable arm relative to the housing requires the pinion gear to rotate in a first direction, while outward extension of the adjustable arm relative to the housing requires the pinion gear to rotate in the second, opposite direction.

In an embodiment, the adjustable arm may have a window into which the pinion gear is placed. The gear rack may be disposed on a longitudinal inner edge of the window. When the arm is extended outwardly relative to the housing by a maxim permitted distance, the terminal edge of the window will abut the pinion gear, and in this manner, the adjustable arm will be restricted against further outward extension, thereby precluding removal of the adjustable arm from the housing.

A ratchet gear is also rotationally disposed within the housing and is joined to the pinion gear in a concentric alignment. The pinion gear and the ratchet gear collectively form a gear assembly. A pawl is pivotally disposed within the housing and operatively engages the ratchet gear. The pawl permits the gear assembly to rotate in the first direction, but precludes the gear assembly from rotating in the second direction. Therefore, the engagement between the pawl and the ratchet gear enables the adjustable arm to retract inwardly relative to the housing, but precludes the adjustable arm from extending outwardly relative to the housing. In this manner, the pawl, which is a part of the locking mechanism, locks the adjustable arm in place to secure the laptop within the anti-theft device.

The locking mechanism further includes a biasing element, such as a coil spring, which is operatively connected to the pawl. The biasing element applies a biasing force onto the pawl, urging it into the operative engagement with the ratchet gear.

The locking mechanism further includes an actuator disposed within the housing. In an actuated state, the actuator counteracts the biasing force of the biasing element, therefore disengaging the pawl from the ratchet gear. When the pawl is disengaged from the ratchet gear, the gear assembly can rotate in the second direction, thereby permitting the adjustable arm to extend outwardly relative to the housing. Thus, when the actuator is in the actuated state, the adjustable arm can be extended into an open position in which the grip disengages the edge of the lid portion of the laptop computer, permitting removal thereof from the stand.

In an embodiment, the actuator is a solenoid. The solenoid may be electrically connected, via a switch, to a power source (such as a battery), which may be disposed within the housing or externally to the anti-theft device. The switch has a closed state in which a closed electrical circuit is formed between the power source and the solenoid and an open state in which the electrical circuit therebetween is broken. When the switch is closed, the solenoid is energized (actuated), and when the switch is open, the solenoid is de-energized. The pawl is configured to pivot about a fulcrum and has a tail portion positioned on the opposite side of the fulcrum relative to the pawl's operating end. When the solenoid is energized, its piston applies a force onto the tail of the pawl, which causes the pawl to pivot about the fulcrum, disengaging the operating end thereof from the ratchet gear. And, as explained above, when the pawl is disengaged from the ratchet gear, the gear assembly (including the pinion gear) can rotate in reverse, thereby permitting the adjustable arm to be extended outwardly relative to the housing such that the grip can be removed from the edge of the laptop's lid portion.

The anti-theft device may further include a fob configured to transmit a signal, while a receiver disposed within the housing is configured to detect that signal. When receiver detects a predefined signal, the receiver triggers the closing of the switch, thereby energizing the solenoid to disengage the pawl from the ratchet gear. Likewise, another signal transmitted by the fob may trigger the opening of the switch, thereby de-energizing the solenoid and returning the pawl into operative engagement with the ratchet gear.

In an embodiment, the anti-theft device may include a second adjustable arm with a second grip. The second adjustable arm may also be slidingly disposed within the housing, in an opposite configuration relative to the first arm, so that the first and the second grips are positioned on the opposite sides of the housing and are configured to receive opposite edges of the lid portion of the laptop computer. The second adjustable arm has a second gear rack disposed therealong and operatively engages the pinion gear. The gear racks of the first and the second arms are positioned on the opposite sides of the pinion gear, such that the pinion gear translates linear movement of the first adjustable arm to the second adjustable arm, thereby synchronizing inward retraction and outward extension of the adjustable arms. This feature ensures that the grips are equidistant relative to the center of the stand, thereby facilitating attractive central display of the laptop.

DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiment, reference is made to the accompanying drawings, which form a part hereof, and within which specific embodiments are shown by way of illustration by which the invention may be practiced. It is to be understood that other embodiments may be utilized and structural changes may be made without departing from the scope of the invention.

1. Anti-Theft Device for Securing a Laptop Computer

Figure 1A:
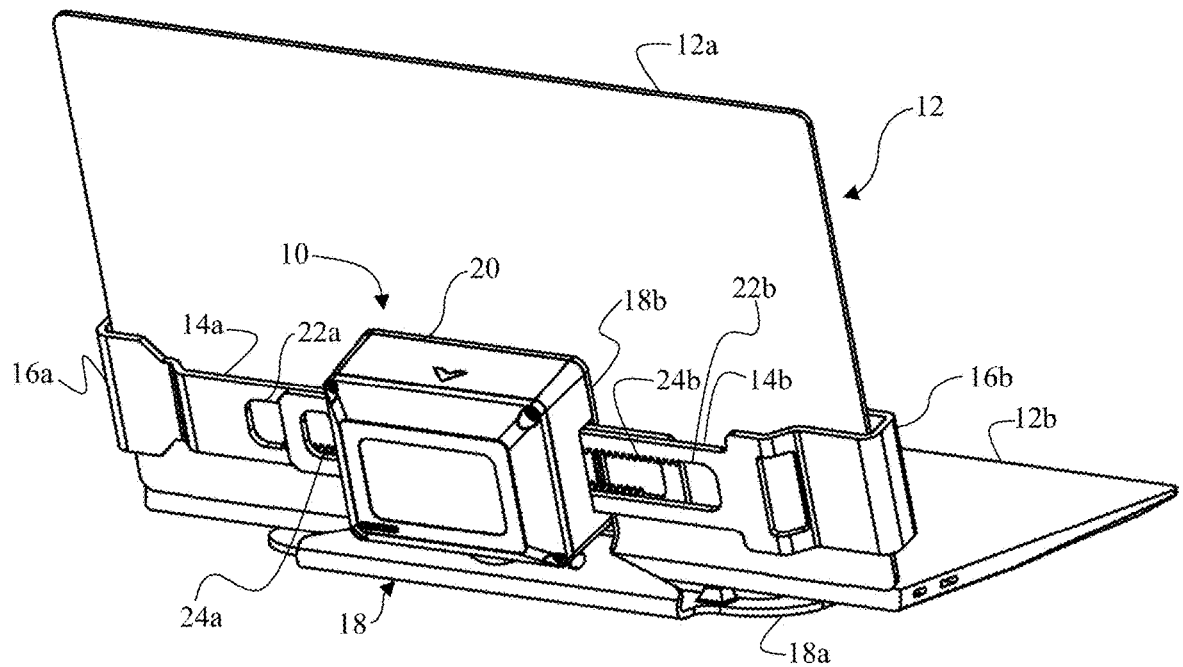
FIG. 1A is a perspective back view depicting a laptop computer secured within the locked arms of the anti-theft device.
Figure 1B:
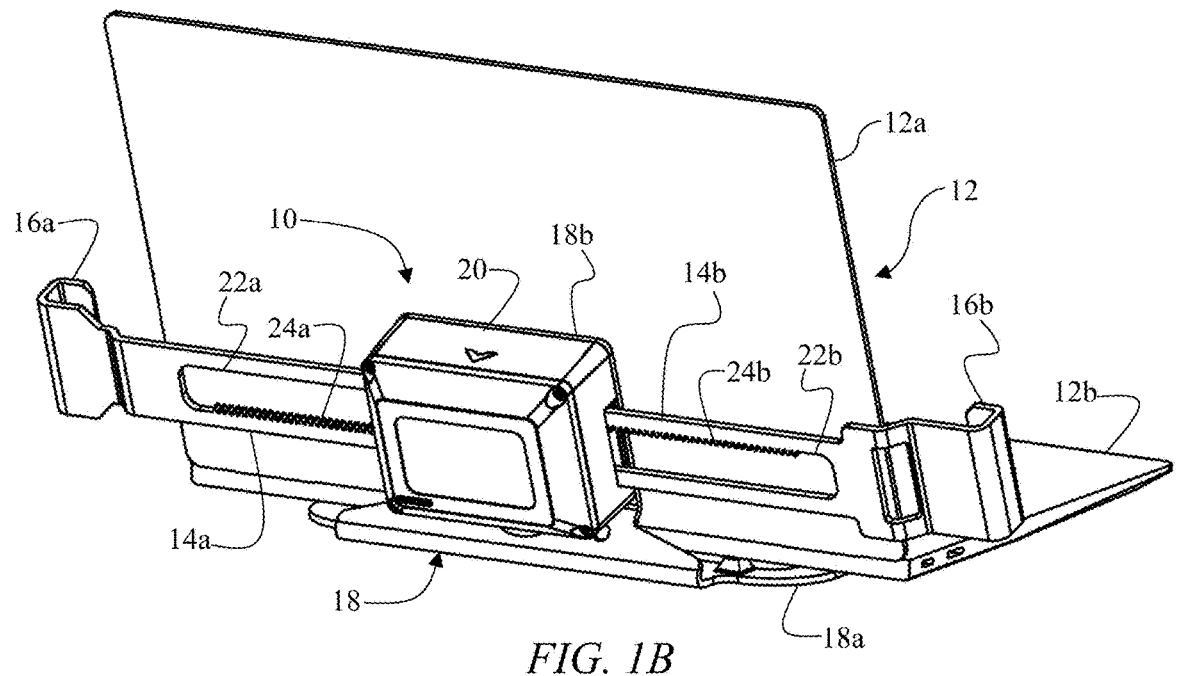
FIG. 1B is a perspective back view depicting the anti-theft device in an unlocked configuration.

FIGS. 1A-1B depict an anti-theft device 10 for securing a laptop 12. The anti-theft device 10 has adjustable arms 14a and 14b which terminate with U-shaped grips 16a and 16b, respectively. When the adjustable arms 14a and 14b are in their closed positions depicted in FIG. 1A, the U-shaped grips 16a and 16b receive the opposite edges of the lid portion 12a of the laptop computer 12. FIG. 1B depicts an open configuration of the adjustable arms 14a and 14b, in which U-shaped grips 16a and 16b are separated by a distance exceeding the width of the laptop 12, thereby permitting its removal.

Figure 2:
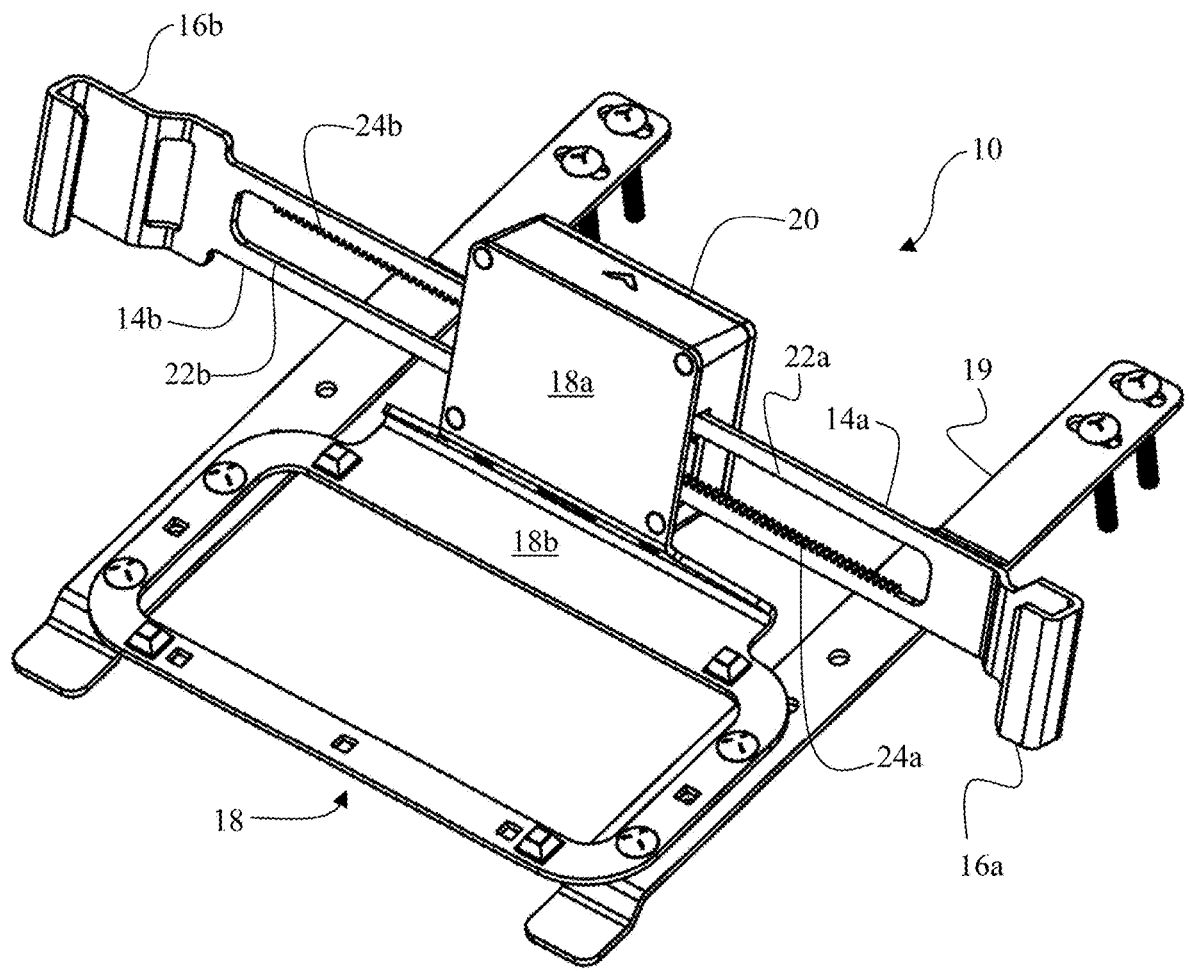
FIG. 2 is a perspective front view of an embodiment of the anti-theft device.

FIG. 2 depicts that the anti-theft device 10 comprises a stand 18 configured to be mounted directly to a retail display counter or to a specialized frame 19. The stand 18 has an angled configuration that includes a base portion 18a and a lateral portion 18b. A housing 20 is affixed to the lateral portion 18b of the stand 18.

Figure 3A:
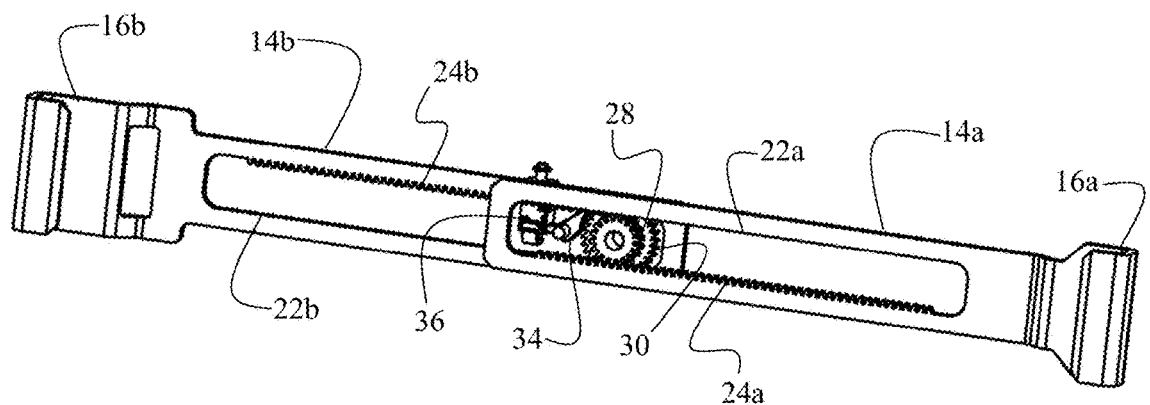
FIG. 3A is a front view of the adjustable arms and the locking mechanism.
Figure 3B:
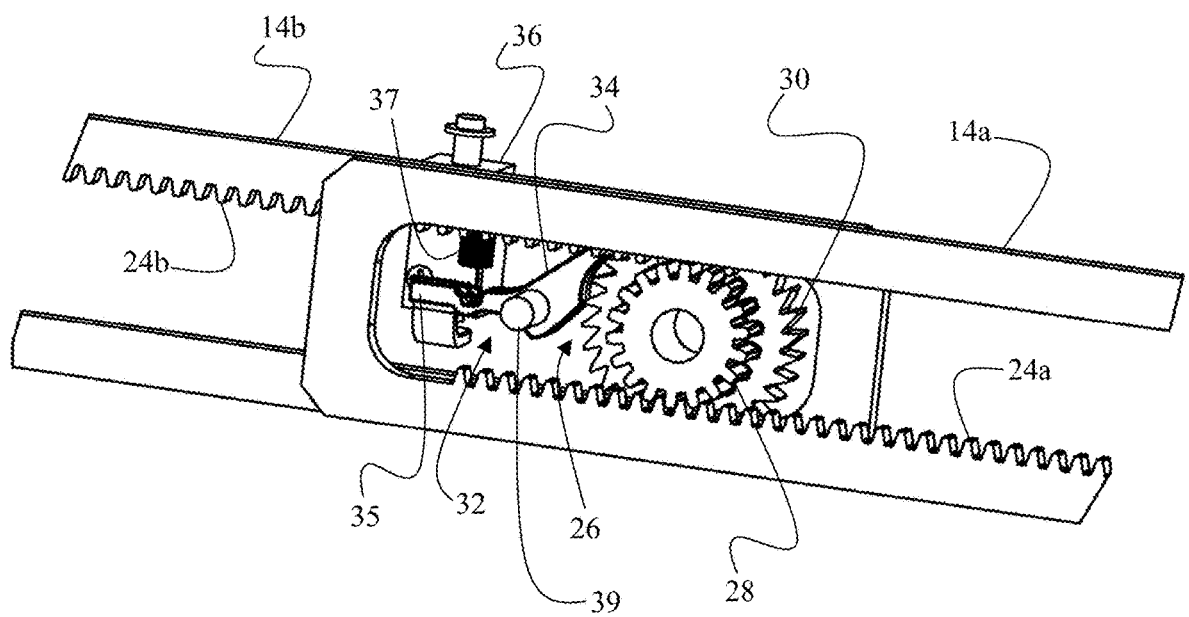
FIG. 3B is a front detail view of the adjustable arms and the locking mechanism.

FIGS. 3A and 3B show that the adjustable arms 14a and 14b are partially disposed within the housing 20 in an overlapping relationship—i.e., the arm 14b is positioned behind the arm 14a. The arms 14a and 14b are configured to linearly translate relative to the housing 20 in an inwardly retracting and outwardly extending manner. The housing 20 may have a track that constrains the movement of the arms 14a and 14b solely to linear translation relative to the housing. FIGS. 3A and 3B further show that the first arm 14a has a first longitudinal window 22a, while the second arm 14b has a second longitudinal window 22b. A first gear rack 24a is disposed along the bottom edge of the first window 22a, and the second gear rack 24b is disposed along the top edge of the second window 22b. In this manner, the gear racks 24a and 24b are disposed in an opposing relation with respect to one another.

The adjustable arms 14a and 14b terminate with U-shaped grips 16a and 16b, respectively. The U-shaped grips 16a and 16b are offset toward the front relative to the arms 14a and 14b, providing sufficient clearance for the lid portion 12a of the laptop computer 12 relative to the lateral portion 18b of the stand 18. Furthermore, the grips 16a and 16b are positioned above the body portion 12b of the laptop computer 12 and do not restrict the body portion 12b from being lifted from the stand 18. In this manner, a customer can lift the laptop computer 12 from the stand 18 to feel its actual weight. When a customer lifts the laptop computer 12, its lid portion 12a will slide within the U-shaped grips 16a and 16b, until the base portion 12b of the laptop 12 contacts the bottom edges of the U-shaped grips 16a and 16b. In this manner, the customer can feel the true weight of the laptop 12, without compromising security.

Pawl-and-Ratchet-Gear Locking Mechanism

Figure 4A:
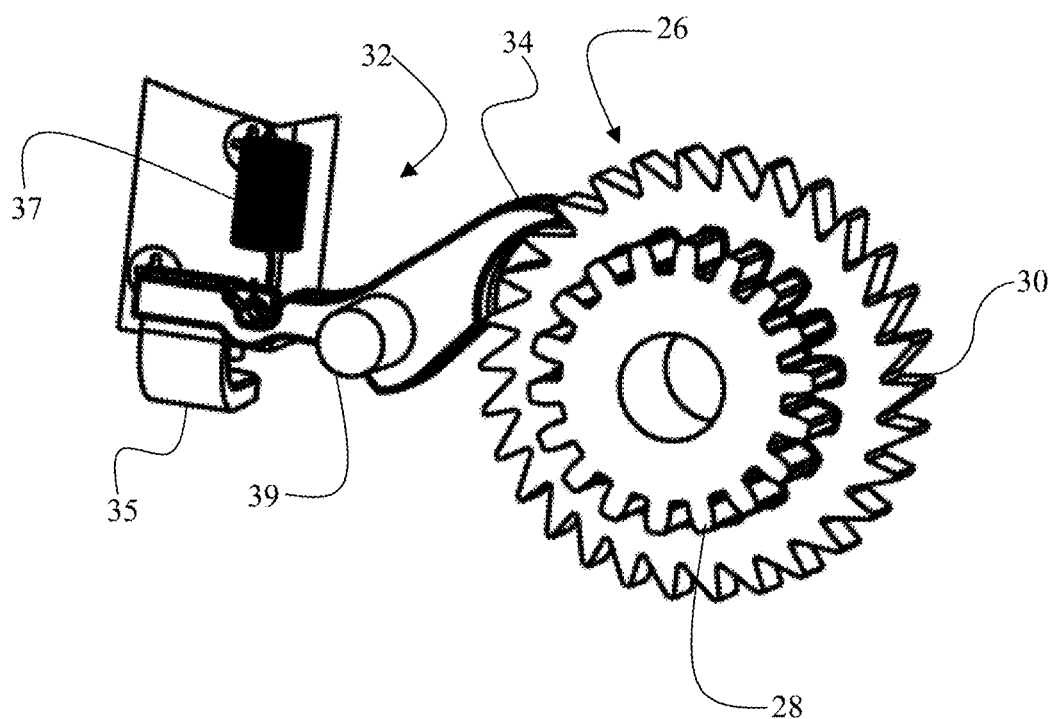
FIG. 4A is a front view of the locking mechanism engaging the gear assembly in a locking configuration of the anti-theft device.
Figure 4B:
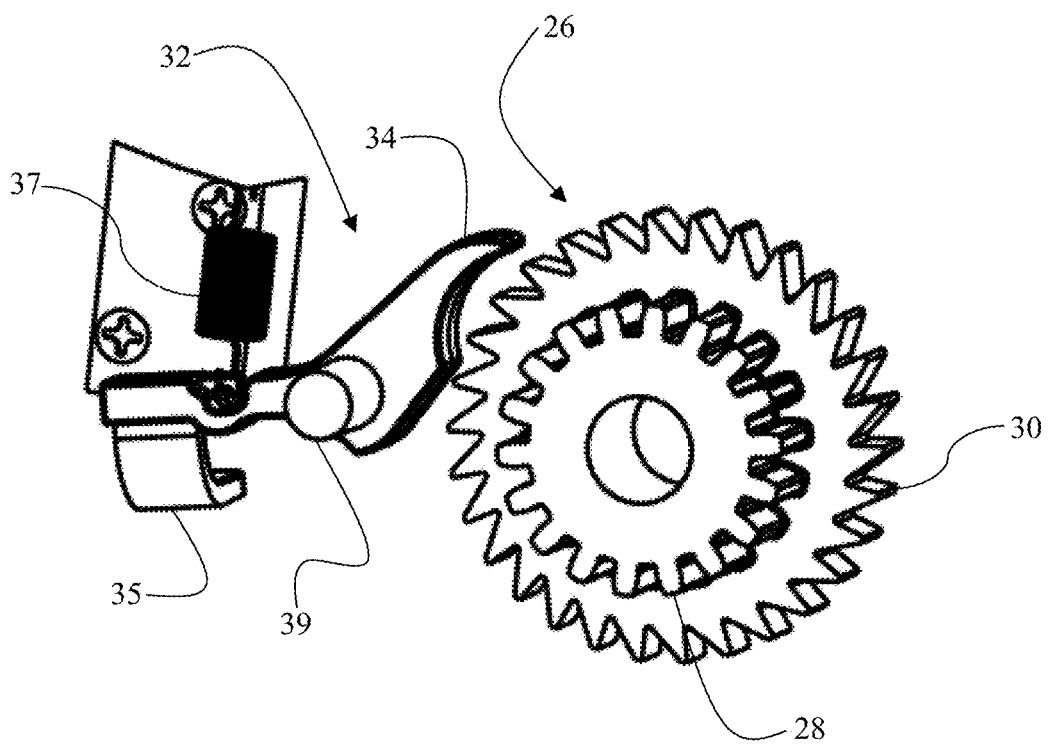
FIG. 4B is a front view of the locking mechanism disengaged from the gear assembly in an unlocked configuration of the anti-theft device.

FIGS. 4A and 4B depict a gear assembly 26, which is rotationally disposed within the housing 20. The gear assembly 26 includes a pinion gear 28 and a ratchet gear 30. The pinion gear 28 and the ratchet gear 30 are concentric and are fixedly joined together. The gears 28 and 30 can either be joined together in any manner known in the art including using fasteners, adhesive, welding or the gear assembly may be manufactured as a monolithic component.

The pinion gear 28 is positioned within the windows 22a and 22b of arms 14a and 14b, while the ratchet gear 30 is positioned outside the windows 22a and 22b, behind the arms 14a and 14b. The pinion gear 28 operatively engages both gear racks 24a and 24b. Because the gear racks 24a and 24b are oriented in an opposing manner, the pinion gear 28 synchronizes their movement relative to one another, whereby an inward linear displacement of the first arm 14a causes the pinion gear 28 to rotate, and this rotation causes the second arm 14b to also move inwardly by the same distance as the first arm 14a. Thus, when a user slides the first arm 14a inwardly relative to the housing 20, the second arm 14b also slides inwardly relative to the housing 20 by the same distance. Analogously, when the arm 14a is extended relative to the housing 20, the pinion gear 28 translates that displacement to the arm 14b, causing it to extend by the same distance. In this manner, arms 14a and 14b are configured to always be equidistant relative to the housing 20, thereby automatically aligning the laptop computer 12 in the center of the anti-theft device 10, which facilitates a neat and attractive display.

FIGS. 4A and 4B further depict a locking mechanism 32. FIG. 4A shows that the locking mechanism 32 comprises a pawl 34 that engages the ratchet gear 30, thereby precluding the gear assembly 26 from rotating in reverse, including the pinion gear 28. Thus, when the locking mechanism 32 is in a locking configuration—the configuration in which the pawl 34 engages the ratchet gear 30—the arms 14a and 14b can only slide inwardly relative to the housing 20, while their outward movement is precluded because the pinion gear 28 cannot rotate in reverse due to engagement between the ratchet gear 30 and the pawl 34.

The locking mechanism 32 further includes a biasing element 37, which is operatively connected to the pawl 34 and urges the pawl 34 into engagement with the ratchet gear 30.

To secure the laptop 12 within the anti-device 10, the U-shaped grips 16a and 16b must be initially separated by a distance exceeding the width of the laptop 12, thereby permitting the laptop 12 to be positioned onto the stand 18 with the lid portion of the laptop opened, as depicted in FIG. 1B. Then, the arms 14a and 14b are retracted into housing 20, thereby reducing the distance between the grips 16a and 16b until they receive the edges of the lid portion of the laptop 12 therein, as depicted in FIG. 1A. At this point, the laptop 12 is secured within the anti-theft device 10.

To remove the laptop computer 12 from the anti-theft device 10, the pawl 34 must be disengaged from the ratchet gear 30, as depicted in FIG. 4B, thus enabling the gear assembly 26 (including the pinion gear 28) to rotate in reverse. Then, while the pawl 34 remains retracted away from the ratchet gear 30, the user must slide the arms 14a and 14b apart until the distance between the U-shaped grips 16a and 16b exceeds the width of the laptop 12, at which point the laptop 12 can be removed from the stand 18. The pawl 34 can then be transitioned into is locking configuration in which the pawl 34 operatively engages the ratchet gear 30, as depicted in FIG. 4A, and the anti-theft device 10 is ready to secure the laptop 12, as disclosed above.

Figure 5A:
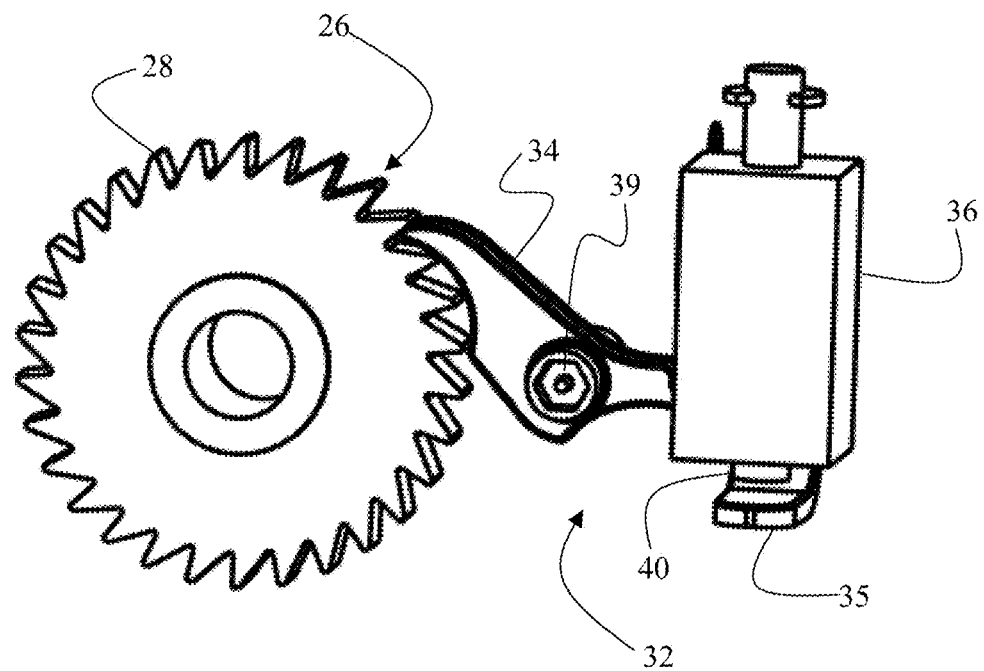
FIG. 5A is a back view of the locking mechanism engaging the gear assembly in a locking configuration of the anti-theft device.
Figure 5B:
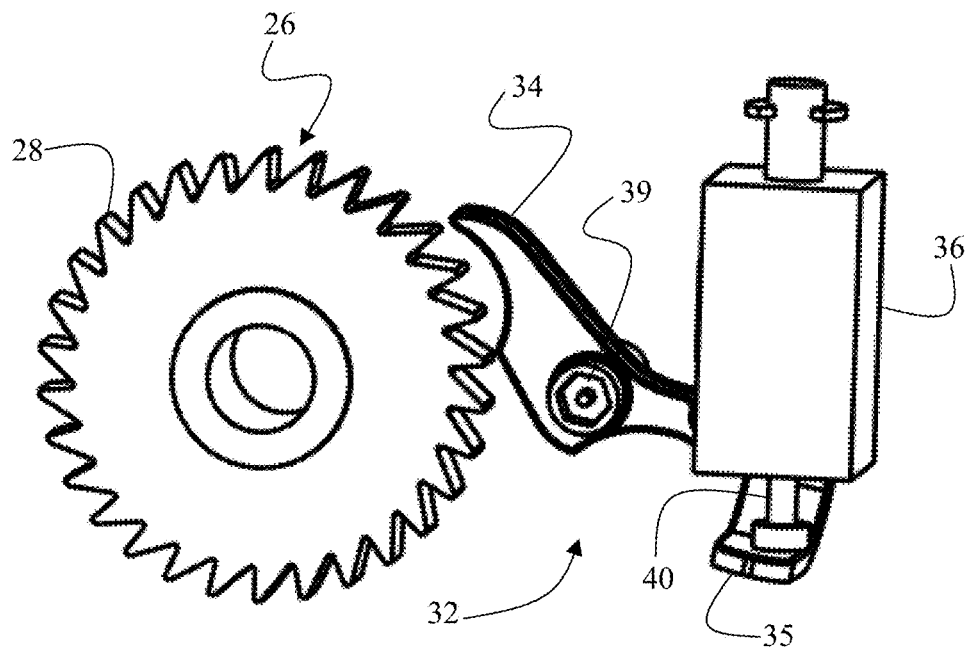
FIG. 5B is a back view of the locking mechanism disengaged from the gear assembly in an unlocked configuration of the anti-theft device.
Figure 6:
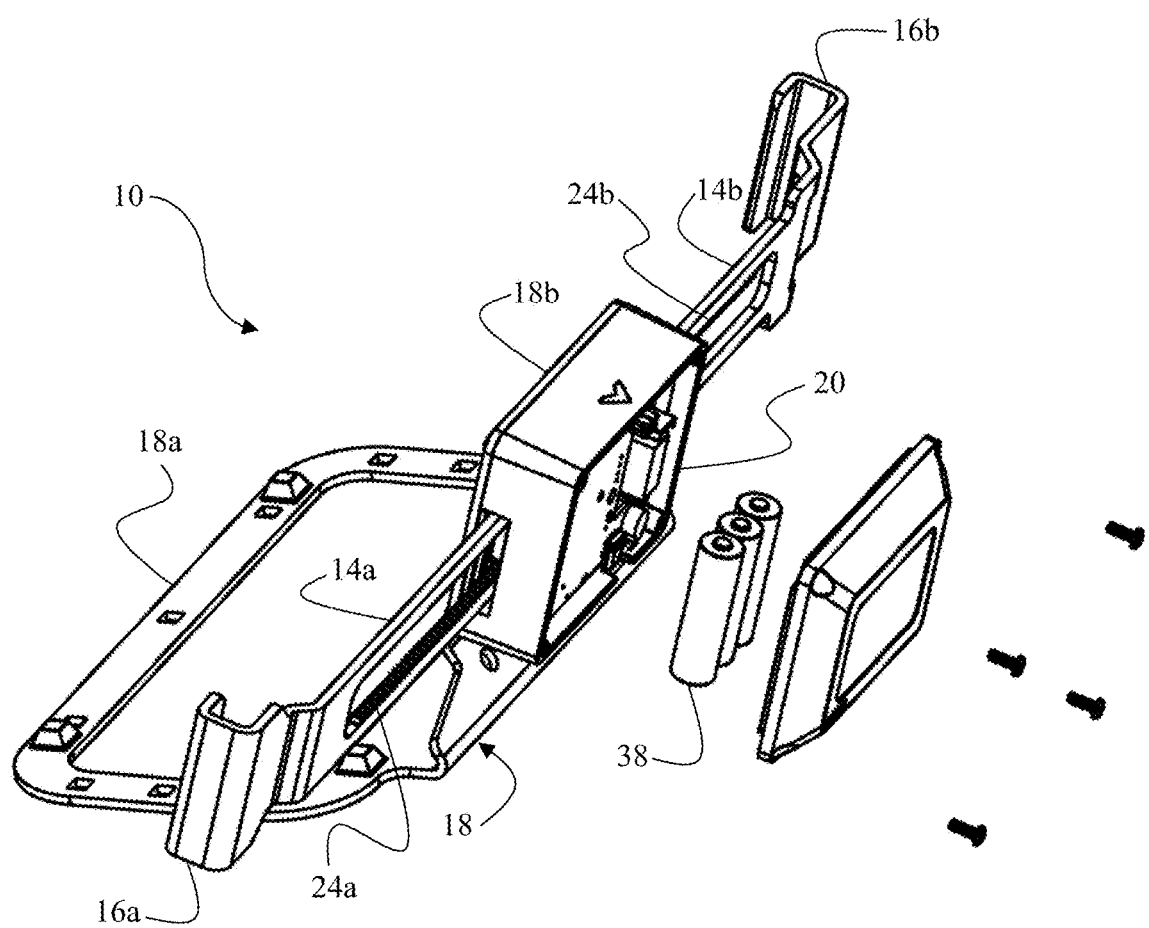
FIG. 6 is an exploded perspective view of the anti-theft device.

FIGS. 5A and 5B depict that the locking mechanism 32 may include an actuator, such as a solenoid 36, an electric motor, a pneumatic actuator, a magnetic actuator, or any other type of actuator known in the art. FIG. 6 depicts that the locking mechanism 32 is disposed within the housing 20 and may be electrically connected to a power source 38, such as a battery, which also may be disposed within the housing 20 and electrically connected to the solenoid 36 via a switch. In the locking configuration, depicted in FIG. 5A, the switch is opened and the electric current from the power source 38 is not conveyed to the solenoid 36. The piston 40 of the solenoid 36 is retracted away from the tail 35 of the pawl 34, which is disposed on the opposite side of the fulcrum 39 relative to the pawl's operating end. In this locking configuration, the biasing element 37 presses the pawl 34 against the ratchet gear 30. Because the pawl 34 precludes the gear assembly 26 from rotating in reverse, the retaining the arms 14a and 14b are in the locked state, whereby the engagement between the gear racks 24a and 24b and the pinion gear 28 precludes the arms 14a and 14b from being extended out of the housing 20. In an embodiment, the stand 18, the arms 14a and 14b and the gear assembly 26 are made out of a metal or a metal alloy (such as steel), thereby reducing the likelihood of forced or accidental damage to these components, ensuring the longevity and the high level of security provided by the anti-theft device 10.

FIG. 5B depicts the unlocked configuration of the locking mechanism 32. In this configuration, the switch connecting the solenoid 36 to the power source 38 is closed and the solenoid 36 is an energized state. The piston 40 extends from the solenoid 36 and applies a force onto the tail 35 of the pawl 34. The force applied onto the tail 35 of the pawl 34 exceeds the biasing force exerted onto the pawl 34 by the biasing element 37. This causes the pawl 34 to pivot away from and disengage the ratchet gear 30, thereby transitioning the locking mechanism 32 into the unlocked configuration, in which the gear assembly 26 can rotate in reverse, which releases the arms 14a and 14b to outwardly extend relative to the housing 20.

Figure 7:
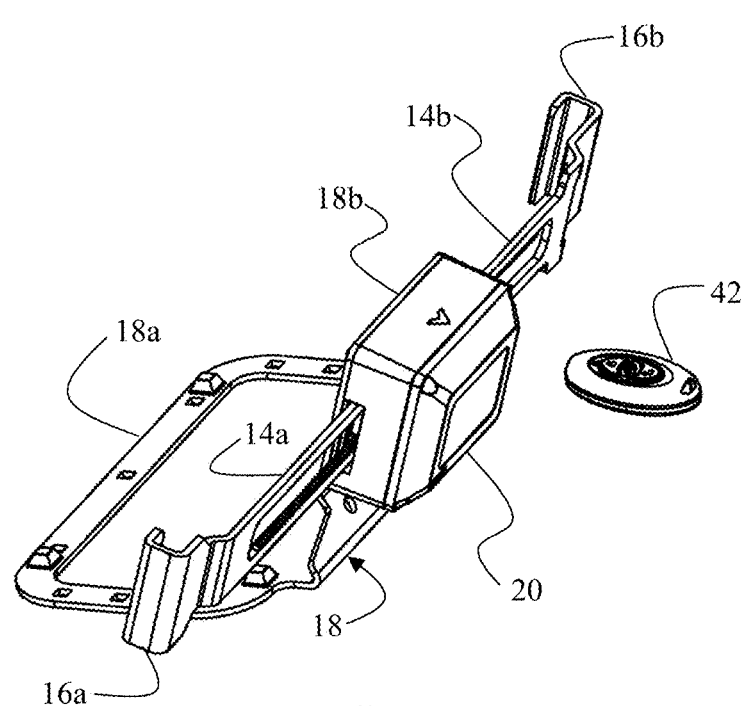
FIG. 7 is a perspective view of the anti-theft device and a security fob for transitioning the anti-theft device into the unlocked configuration.

Thus, to actuate the solenoid 36, the switch must be closed, forming an electrical circuit between the power source 38 and the solenoid 36. A switch may be configured to be closed in response to a predefined wireless signal. FIG. 7 depicts a wireless fob 42 configured to transmit such signal to a corresponding receiver within the housing 20. Examples of the wireless signals and the corresponding transmitter and receiver devices may include the following: infrared (IR), radio frequency (RF), near-field communications (NFC), Wi-Fi, UWB (UltraWideBand), BT or BLE (Bluetooth or Bluetooth Low Energy), Cellular/5G/6G, LoraWAN, audio/voice commands, magnetics, etc.

When an authorized user actuates the wireless signal transmitter—for example by pressing a button on the fob 42—the receiver within the housing 20 receives the wireless signal and actuates the solenoid 36 (or another actuator). The piston 40 of the solenoid 36 extends and applies a force onto the tail 35 of the pawl 34, thereby causing the pawl 34 to pivot about fulcrum 39 away from the ratchet gear 30. When the pawl 34 is in this disengaged position, the user can slide the arms 14a and 14b outwardly relative to the housing 20 so that the distance between the U-shaped grips 16a and 16b exceeds the width of the laptop computer 12, as depicted in FIG. 1B. At this point, the laptop computer 12 may be removed from the anti-theft device 10. The user can then use the fob 42 to transmit another predefined wireless signal to the anti-theft device 10 to open the switch and deactivate the solenoid 36. When the piston 40 of the solenoid 36 retracts away from the tail 35 of the pawl 34, the biasing element 37 returns the pawl 34 into the operative engagement with the ratchet gear 30, thereby transitioning the anti-theft device 10 into the locking configuration. The biasing element 37 may be a coil spring that biases the pawl 34 toward its engaged position, and when the piston 40 of the solenoid 36 is retracted away from the tail 35 of the pawl 34, the biasing force causes the pawl 34 to reengage the ratchet gear 30.

2. Anti-Theft Device for Securing Smartphones and Tablets

Figure 8A:
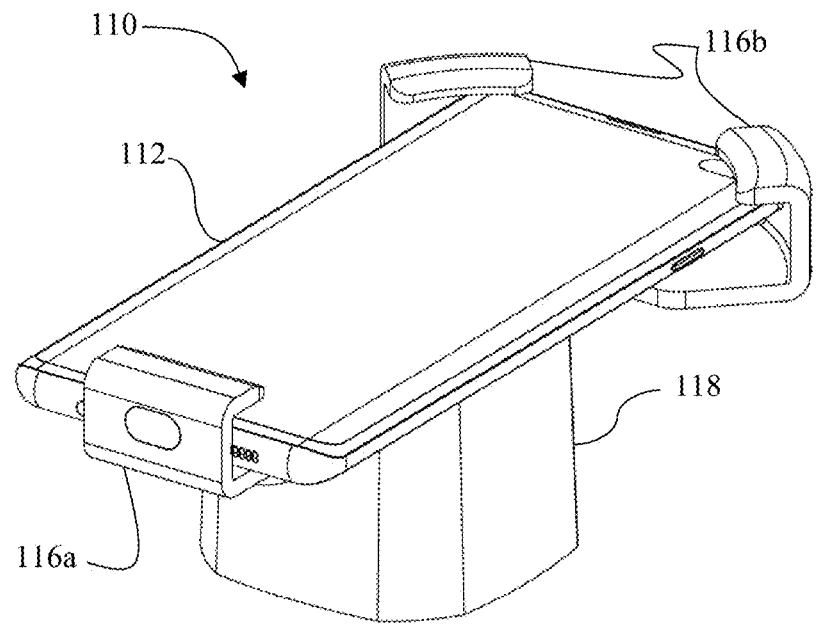
FIG. 8A is a perspective view of an embodiment of the anti-theft device in a locked configuration securing a merchandise item within the grips.
Figure 8B:
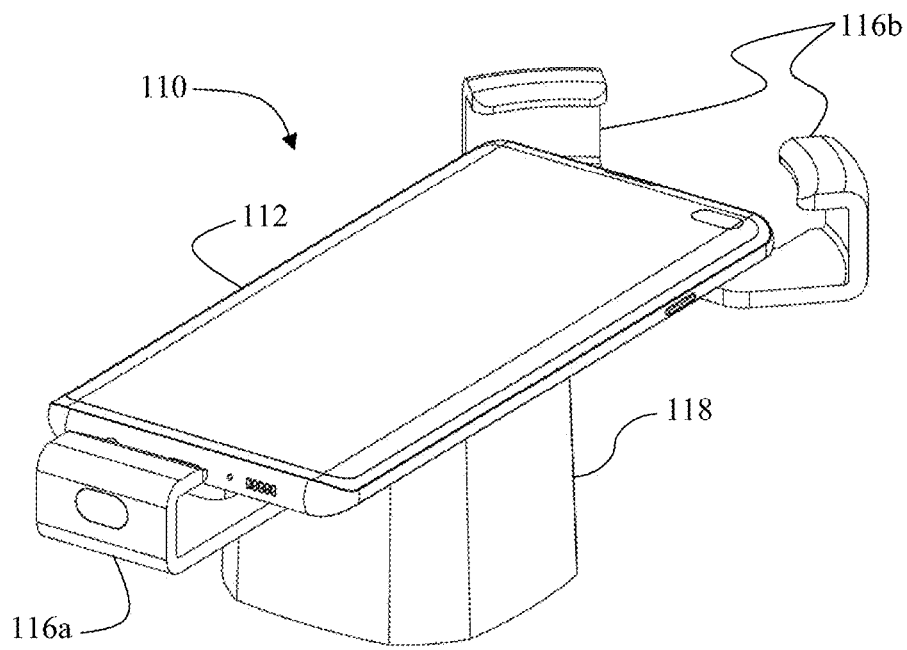
FIG. 8B is a perspective view of the anti-theft device in an unlocked configuration in which the merchandise can be removed from the stand.
Figure 8C:
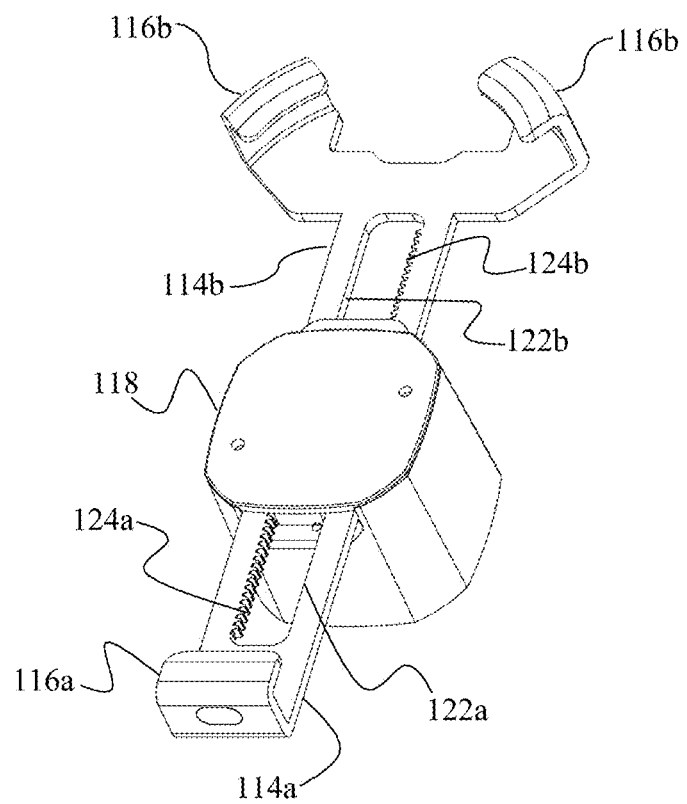
FIG. 8C is a perspective view of the anti-theft device with the merchandise removed therefrom.
Figure 9:
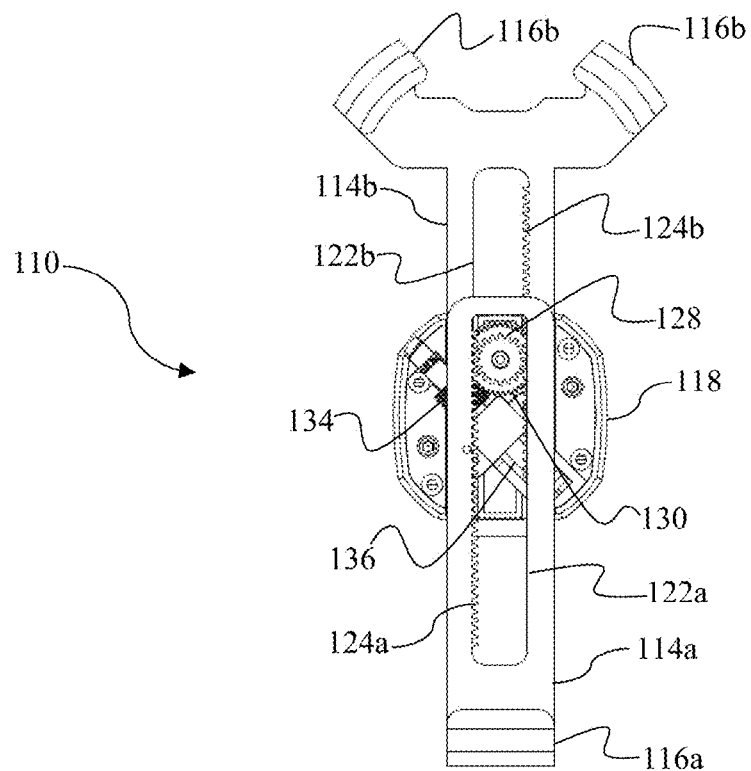
FIG. 9 is a top view of the anti-theft device with the stand cover removed and showing the worm-drive locking mechanism disposed within the stand.
Figure 10:
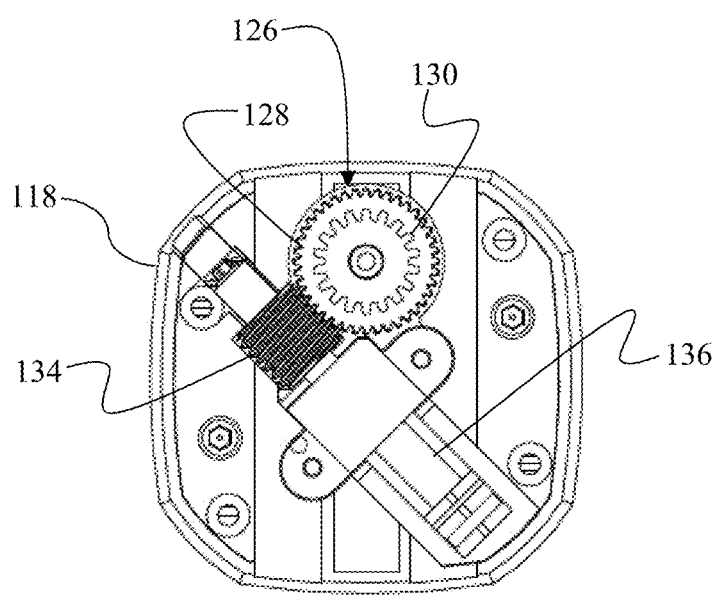
FIG. 10 is a top view of stand with the cover and the arms removed, showing the worm-drive locking mechanism.

FIGS. 8-10 depict an embodiment of an anti-theft device 110 configured for securing planar merchandise 112, such as smartphones and tablets. FIGS. 8A-8C depict that, analogously to the embodiment disclosed in FIGS. 1-7, the anti-theft device 110 includes adjustable arms 114a and 114b, which terminate with U-shaped grips 116a and 116b. The anti-theft device 110 includes a stand 118 configured to be mounted to a display counter. The adjustable arms 114a and 114b are slidingly coupled to the stand 118 and are configured to inwardly retract into a closed position in which the grips 116a and 116b secure the merchandise 112 as depicted in FIG. 8A. The adjustable arms 114a and 114b are also configured to outwardly extend into an open position in which the merchandise 112 is released from the grips 116a and 116b and can be removed from the stand 118, as depicted in FIG. 8B.

As shown in FIG. 8C, the grips 116a and 116b can have various configurations. For example, the first adjustable arm 114a has a single U-shaped grip 116a aligned with the stem of the arm 114a, while the adjustable arm 114b has two inwardly facing grips 116b branching out at an angle relative to the stem of the arm 114b. This configuration enables the anti-theft device 110 to accommodate various dimensions of merchandise 112 because the grips 116b can properly secure merchandise 112 irrespective of where its corners are positioned within the grips 116b. In other words, the grips 116b can properly secure the merchandise 112 irrespective of its width as long as that width is within the dimensional range defined by the innermost and outermost distances separating the grips 116b. Accordingly, the angled arrangement of the grips 116b provides universal versatility, enabling the anti-theft device 10 to secure various types of merchandise 112, without replacing arms 114a and 114b.

FIG. 9 depicts that the adjustable arms 114a and 114b have windows 122a and 122b disposed therein. Gear racks 224a and 224b are disposed on the inner longitudinal edges of the windows 122a and 122b, respectively. The arms 114a and 114b are positioned in an overlapping relation to one another such that their windows 122a and 112b are aligned transversely and partially aligned longitudinally. A gear assembly 126 is rotationally disposed within the stand 118. The gear assembly 126 includes a pinion gear 128 which is positioned within the windows 122a and 112b and simultaneously engages both gear racks 124a and 124b, which are positioned on opposite sides of the pinion gear 128. In this manner, rotation of the pinion gear 128 causes both arms 114a and 114b to either synchronously retract or extend relative to the stand 118.

Worm-Drive Locking Mechanism

As shown in FIG. 10, the gear assembly 126 includes a worm wheel 130 which is joined to the pinon gear 128 in a concentric alignment. A worm 134 is rotationally disposed within the stand 118 and operatively engages the worm wheel 130, collectively forming a worm drive. In this manner, rotation of the worm 134 causes the gear assembly 126 to rotate in the first direction, wherein the rotation of the pinion gear 128 the gear racks 124a and 124b to translate linearly relative to the stand 118, thereby retracting the adjustable arms 114a and 114b. Analogously, reverse rotation of the worm 134 causes the adjustable arms 114a and 114b to extend relative to the stand 118. In this manner, rotation of the worm 134 retracts the adjustable arms 114a and 114b to lock the merchandise 112 within the grips 116a and 116b, as shown in FIG. 8A, while reverse rotation of the worm 134 extends the adjustable arms 114a and 114b thereby releasing the merchandise 112 from the grips 116a and 116b, as shown in FIG. 8B. Furthermore, the worm drive prevents the adjustable arm from being extended or retracted via application of a manual force.

A motor 136 is disposed within the stand 118 and is operatively connected to the worm 134. The motor 136 has two operating modes in which the motor 136 is configured to selectively spin the worm 134 either clockwise or counterclockwise, thereby selectively retracting or extending the adjustable arms 114a and 114b. The motor 136 may be actuated in response to a wireless signal transmitted by the fob 42, as disclosed above. In an embodiment, the fob 42 may be configured to transmit two different signals: the first signal triggers the first operating mode of the motor 136, while the second signal triggers the second operating mode of the motor 136, in which the motor spins in reverse. In this manner, authorized personnel can use the fob 42 to either extend the adjustable arms 114a and 114b by pressing a first designated button, thereby releasing the merchandise 112 from the anti-theft device 110, or to retract the adjustable arms 114a and 114b by pressing a second designated button, thereby locking the merchandise 112 within grips 116a and 116b.

In an embodiment, the motor 136 may be equipped with a sensor configured to detect increased resistance from the rotation of the worm 134 and to deactivate the motor when such increased resistance is detected. The sensor enables the automatic shut-off features such that the motor 136 automatically turns off when the transverse edges of the windows 122a and 122b reach the pinion gear 128. In this manner, the anti-theft device 110 automatically shuts off the motor 136 during the locking procedure when the edges of the merchandise 112 are fully received within the grips 116a and 116b to prevent damaging the merchandise 112 and/or the gears of the anti-theft device. Likewise, the motor 136 is configured to automatically shut off when the adjustable arms 114a and 114b achieve their fully extended position, thereby preventing damage to the motor 136 or the gears of the anti-theft device 110. This automatic shut-off feature also serves a safety function by ensuring that the motor 136 is deactivated if clothing or a body part is caught between the gear teeth or between the edge of the merchandise 112 and the grips 116a or 116b.

In alternative embodiment, the anti-theft device 110 can be implemented with a pawl-and-ratchet-gear locking mechanism 32 described above. Likewise, the anti-theft device 10 can be used with the worm-drive locking mechanism.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. An anti-theft device for securing a merchandise against theft, comprising:
   a stand configured to be anchored to a display surface and configured to support the merchandise thereon;
   an adjustable arm having a first portion slidingly coupled to the stand and a second portion positioned outside the stand and terminating with a grip, wherein the grip is configured to receive an edge or a corner of the merchandise when the adjustable arm is in a closed position;
   a gear rack disposed along the first portion of the adjustable arm;
   a pinion gear rotationally disposed within the stand and operatively engaged with the gear rack of the adjustable arm, wherein rotation of the pinion gear in a first direction causes the adjustable arm to retract relative to the stand and rotation of the pinion gear in the second direction causes the adjustable arm to extend relative to the stand;
   a worm wheel joined to the pinion gear in a concentric alignment therewith, the worm wheel and the pinion gear collectively forming a gear assembly;
   a worm operatively engaging the worm wheel collectively forming a worm drive, wherein the worm precludes the gear assembly from rotating while the worm drive is not operating, thereby immobilizing the adjustable arm relative to the stand; and
   a motor operatively connected to the worm drive, wherein the motor has a first operating mode in which the motor causes the gear assembly to rotate in the first direction thereby retracting the adjustable arm relative to the stand thus securing the merchandise within the grip, and a second operating mode in which the motor spins the worm in reverse causing the gear assembly to rotate in the second direction thereby extending the adjustable arm relative to the stand and releasing the merchandise from the grip and enabling removal thereof from the stand;
   wherein in the first operating mode, the motor is configured to cease operating in response to experiencing increased resistance, thereby stopping retraction of the adjustable arm relative to the stand when the merchandise is secured within the grip.

2. The anti-theft device of claim 1, further comprising a fob configured to transmit a first signal and a receiver disposed within the stand configured to detect the first signal, wherein in response to the receiver detecting the first signal, the motor is actuated in the first operating mode, thereby causing the gear assembly to rotate in the first direction, thus retracting the adjustable arm.

3. The anti-theft device of claim 2, wherein the fob is configured to transmit a second signal, and wherein the motor is actuated in the second operating mode in response to the receiver detecting the second signal thereby causing the gear assembly to rotate in the second direction, thus extending the adjustable arm relative to the stand.

4. The anti-theft device of claim 3, wherein the motor is configured to cease operating in response to experiencing increased resistance, thereby stopping extension of the adjustable arm when the pinion gear engages a stop at a terminal end of the gear rack.

5. The anti-theft device of claim 1, wherein the worm drive prevents the adjustable arm from being extended via application of a manual force thereto.

6. The anti-theft device of claim 5, wherein the first and the second grips are angled relative to the adjustable arm.

7. The anti-theft device of claim 1, wherein the grip is a first grip and the adjustable arm further comprises a second grip, wherein the first grip is configured to receive a first corner of the merchandise and the second grip is configured to receive the second corner thereof.

8. The anti-theft device of claim 1, wherein the adjustable arm is a first adjustable arm and the grip is a first grip, further comprising a second adjustable arm slidingly coupled to the stand and terminating with a second grip, wherein the first and the second grips are positioned on the opposite sides of the stand and are configured to secure opposite edges of the merchandise.

9. The anti-theft device of claim 8, wherein a second gear rack is disposed along the second adjustable arm and operatively engages the pinion gear, and wherein the first and the second gear racks are disposed in an opposing relationship with one another relative to the pinion gear, such that the pinion gear synchronizes inward retraction and outward extension of the first and the second adjustable arms.

10. An anti-theft device for securing a merchandise against theft, comprising:
a stand configured to be anchored to a display surface and configured to support the merchandise thereon;
an adjustable arm having a first portion slidingly coupled to the stand and a second portion positioned outside the stand and terminating with a grip, wherein the grip is configured to receive an edge or a corner of the merchandise when the adjustable arm is in a closed position;
a gear rack disposed along the first portion of the adjustable arm;
a pinion gear rotationally disposed within the stand and operatively engaged with the gear rack of the adjustable arm, wherein rotation of the pinion gear in a first direction causes the adjustable arm to retract relative to the stand and rotation of the pinion gear in the second direction causes the adjustable arm to extend relative to the stand;
a worm wheel joined to the pinion gear in a concentric alignment therewith, the worm wheel and the pinion gear collectively forming a gear assembly;
a worm operatively engaging the worm wheel collectively forming a worm drive, wherein the worm precludes the gear assembly from rotating while the worm drive is not operating, thereby immobilizing the adjustable arm relative to the stand; and
a motor operatively connected to the worm drive, wherein the motor has a first operating mode in which the motor causes the gear assembly to rotate in the first direction thereby retracting the adjustable arm relative to the stand thus securing the merchandise within the grip, and a second operating mode in which the motor spins the worm in reverse causing the gear assembly to rotate in the second direction thereby extending the adjustable arm relative to the stand and releasing the merchandise from the grip and enabling removal thereof from the stand;
wherein in the second operating mode, the motor is configured to cease operating in response to experiencing increased resistance, thereby stopping extension of the adjustable arm when the pinion gear engages a stop at a terminal end of the gear rack.

11. The anti-theft device of claim 10, further comprising a fob configured to transmit a signal and a receiver disposed within the stand configured to detect the signal, wherein in response to the receiver detecting the signal, the motor is actuated in the first operating mode, thereby causing the gear assembly to rotate in the first direction, thus retracting the adjustable arm.

12. The anti-theft device of claim 10, further comprising a fob configured to transmit a signal and a receiver disposed within the stand configured to detect the signal, and wherein the motor is actuated in the second operating mode in response to the receiver detecting the signal thereby causing the gear assembly to rotate in the second direction, thus extending the adjustable arm relative to the stand.

13. The anti-theft device of claim 10, wherein in the second operating mode, the motor is configured to cease operating in response to experiencing increased resistance, thereby stopping retraction of the adjustable arm when the merchandise is secured within the grip.

14. The anti-theft device of claim 10, wherein the grip is a first grip and the adjustable arm further comprises a second grip, wherein the first grip is configured to receive a first corner of the merchandise and the second grip is configured to receive the second corner thereof.

15. The anti-theft device of claim 14, wherein the first and the second grips are angled relative to the adjustable arm.

16. The anti-theft device of claim 10, wherein the adjustable arm is a first adjustable arm and the grip is a first grip, further comprising a second adjustable arm slidingly coupled to the stand and terminating with a second grip, wherein the first and the second grips are positioned on the opposite sides of the stand and are configured to secure opposite edges of the merchandise.

17. The anti-theft device of claim 16, wherein a second gear rack is disposed along the second adjustable arm and operatively engages the pinion gear, and wherein the first and the second gear racks are disposed in an opposing relationship with one another relative to the pinion gear, such that the pinion gear synchronizes inward retraction and outward extension of the first and the second adjustable arms.

* * * * *